US012152453B2

(12) United States Patent
Hobdy

(10) Patent No.: US 12,152,453 B2
(45) Date of Patent: Nov. 26, 2024

(54) SYSTEMS AND PROCESSES FOR PIGGING ACROSS A BOUNDARY BETWEEN A FIRST BODY ROTATIVELY COUPLED TO A SECOND BODY

(71) Applicant: SOFEC, INC., Houston, TX (US)

(72) Inventor: Miles A Hobdy, Richmond, TX (US)

(73) Assignee: SOFEC, INC., Houston, TX (US)

( * ) Notice: Subject to any disclaimer, the term of this patent is extended or adjusted under 35 U.S.C. 154(b) by 0 days.

(21) Appl. No.: 18/393,231

(22) Filed: Dec. 21, 2023

(65) Prior Publication Data

US 2024/0209705 A1    Jun. 27, 2024

Related U.S. Application Data

(60) Provisional application No. 63/434,676, filed on Dec. 22, 2022.

(51) Int. Cl.
*E21B 23/08* (2006.01)
*E21B 34/06* (2006.01)
*F16L 55/46* (2006.01)

(52) U.S. Cl.
CPC .............. *E21B 23/08* (2013.01); *E21B 34/06* (2013.01); *F16L 55/46* (2013.01)

(58) Field of Classification Search
CPC .... E21B 19/004; E21B 23/08; E21B 43/0107; F16L 55/46
See application file for complete search history.

(56) References Cited

U.S. PATENT DOCUMENTS

| 4,174,127 A | * | 11/1979 | Carn | ....................... F16L 39/06 |
| | | | | 285/190 |
| 4,183,559 A | * | 1/1980 | Stafford | .................. F16L 55/46 |
| | | | | 285/190 |

(Continued)

FOREIGN PATENT DOCUMENTS

| EP | 1632705 A1 * | 3/2006 | ............. B08B 9/055 |
| WO | 199830826 A1 | 7/1998 | |

(Continued)

OTHER PUBLICATIONS

International Search Report and Written Opinion of the International Searching Authority dated Mar. 13, 2024, for PCT/US2024/085538.

*Primary Examiner* — Matthew R Buck
(74) *Attorney, Agent, or Firm* — Edmonds & Cmaidalka, P.C.

(57) ABSTRACT

Systems and processes for pigging. The system can include an inline swivel, a toroidal swivel and a plurality of conduits, each conduit including a valve. A first conduit can be in communication with a supply conduit and the inline swivel. A second conduit can be in communication with the toroidal swivel and the first conduit. A third conduit can be in communication with the first conduit and a first return conduit. A fourth conduit can be in communication with the toroidal swivel and the third conduit. A fifth conduit can be in communication with the inline swivel and a discharge conduit. A sixth conduit can be in communication with the toroidal swivel and the fifth conduit. A seventh conduit can be in communication with the fifth conduit and a second return conduit. An eighth conduit can be in communication with the toroidal swivel and the seventh conduit.

20 Claims, 4 Drawing Sheets

(56) References Cited

U.S. PATENT DOCUMENTS

| | | | | |
|---|---|---|---|---|
| 4,362,325 A | * | 12/1982 | Ortloff | F16L 39/06 |
| | | | | 285/190 |
| 4,391,298 A | * | 7/1983 | Ortloff | F16L 39/06 |
| | | | | 285/190 |
| 4,441,522 A | * | 4/1984 | Griffin | F15D 1/0015 |
| | | | | 285/190 |
| 5,205,768 A | | 4/1993 | Pollack | |

FOREIGN PATENT DOCUMENTS

| | | | | |
|---|---|---|---|---|
| WO | WO-0130646 A1 | * | 5/2001 | E21B 17/015 |
| WO | WO-2020016406 A1 | * | 1/2020 | |
| WO | 2021156812 A1 | | 8/2021 | |

\* cited by examiner

SYSTEMS AND PROCESSES FOR PIGGING ACROSS A BOUNDARY BETWEEN A FIRST BODY ROTATIVELY COUPLED TO A SECOND BODY

CROSS-REFERENCE TO RELATED APPLICATION

This application claims priority to U.S. Provisional Patent Application No. 63/434,676, filed on Dec. 22, 2022, which is incorporated by reference herein.

FIELD

Embodiments described herein generally relate to systems and processes for pigging across a boundary between a first body rotatively coupled to a second body.

BACKGROUND

In the offshore oil and gas industry, it is common to configure a floating vessel to rotate about a rotationally fixed or geostationary structure. This can be accomplished, for example with a turret mooring system. The turret mooring system can include a rotating part connected to the floating vessel and a fixed part connected to the seabed. Such turret mooring systems typically include a fluid conveyance system to provide fluid communication between the vessel and subsea wells or pipelines located on the seabed. The fluid conveyance system spans or crosses between the fixed part of the turret and the rotating part of the turret. Fluid swivels are commonly utilized to maintain fluid communication between the rotating part of the turret and the fixed part of the turret as the rotating part of the turret rotates about the fixed part of the turret.

It is often necessary or desirable to perform "round trip" pigging operations from the vessel or turret to the subsea wells and back. Traditionally, this has been accomplished with pigging facilities such as pig launchers and receivers that are positioned on the fixed part of the turret. Such facilities require significant space, structures, and equipment that are expensive and sometimes difficult to install on the fixed part of the turret.

There is a need, therefore, for improved systems and processes of performing round trip pigging operations from a first body rotatively coupled to a second body.

SUMMARY

Systems and processes for pigging between a first body rotatively coupled to a second body are provided. In some embodiments, a system for pigging between a first body rotatively coupled to a second body can include an inline swivel, a toroidal swivel, a first fluid conduit, a second fluid conduit, a third fluid conduit, a fourth fluid conduit, a fifth fluid conduit, a sixth fluid conduit, a seventh fluid conduit, and an eight fluid conduit. The inline swivel can include a fixed part and a rotating part. The fixed part of the inline swivel can be configured to be connected to the second body and the rotating part of the inline swivel can be configured to be connected to the first body. The toroidal swivel can include a fixed part and a rotating part. The fixed part of the toroidal swivel can be configured to be connected to the second body and the rotating part of the toroidal swivel can be configured to be connected to the first body. The first fluid conduit can be configured to be in fluid communication with a fluid supply conduit disposed on the first body and the rotating part of the inline swivel. The first fluid conduit can include a first launch valve located between the fluid supply conduit and the rotating part of the inline swivel. The second fluid conduit can be in fluid communication with the first fluid conduit and the rotating part of the toroidal swivel. The second fluid conduit can be in fluid communication with the first fluid conduit at a location located between the fluid supply conduit and the first launch valve. The second fluid conduit can include a second launch valve located between the first fluid conduit and the rotating part of the toroidal swivel. The third fluid conduit can be in fluid communication with the first fluid conduit and can be configured to be in fluid communication with a first fluid return conduit disposed on the first body. The third fluid conduit can be in fluid communication with the first fluid conduit at a location located between the first launch valve and the rotating part of the inline swivel. The third fluid conduit can include a first return valve located between the first fluid conduit and the first fluid return conduit. The fourth fluid conduit can be in fluid communication with the rotating part of the toroidal swivel and the third fluid conduit. The fourth fluid conduit can be in fluid communication with the third fluid conduit at a location located between the first fluid return conduit and the first return valve. The fourth fluid conduit can include a second return valve located between the rotating part of the toroidal swivel and the first fluid return conduit. The fifth fluid conduit can be in fluid communication with the fixed part of the inline swivel and can be configured to be in fluid communication with a fluid discharge conduit disposed on the second body. The fifth fluid conduit can include a third launch valve located between the fixed part of the inline swivel and the fluid discharge conduit. The sixth fluid conduit can be in fluid communication with the fixed part of the toroidal swivel and the fifth fluid conduit. The sixth fluid conduit can be in fluid communication with the fifth fluid conduit at a location located between the fluid discharge conduit and the third launch valve. The sixth fluid conduit can include a fourth launch valve located between the fixed part of the toroidal swivel and the fluid discharge conduit. The seventh fluid conduit can be in fluid communication with the fifth fluid conduit and can be configured to be in fluid communication with a second fluid return conduit disposed on the second body. The seventh fluid conduit can be in fluid communication with the fifth fluid conduit at a location located between the third launch valve and the fixed part of the inline swivel. The seventh fluid conduit can include a third return valve located between the fifth fluid conduit and the second fluid return conduit. The eighth fluid conduit can be in fluid communication with the fixed part of the toroidal swivel and the seventh fluid conduit. The eighth fluid conduit can be in fluid communication with the seventh fluid conduit at a location located between the second fluid return conduit and the third return valve. The eighth fluid conduit can include a fourth return valve located between the fixed part of the toroidal swivel and the second fluid return conduit.

In some embodiments, a process for pigging between a first body rotatively coupled to a second body of a system can include inserting a pig into a first fluid conduit. The system can include an inline swivel, a toroidal swivel, a first fluid conduit, a second fluid conduit, a third fluid conduit, a fourth fluid conduit, a fifth fluid conduit, a sixth fluid conduit, a seventh fluid conduit, and an eight fluid conduit. The inline swivel can include a fixed part and a rotating part. The fixed part of the inline swivel can be configured to be connected to the second body and the rotating part of the inline swivel can be configured to be connected to the first body. The toroidal swivel can include a fixed part and a rotating part. The fixed part of the toroidal swivel can be configured to be connected to the second body and the rotating part of the toroidal swivel can be configured to be connected to the first body. The first fluid conduit can be configured to be in fluid communication with a fluid supply conduit disposed on the first body and the rotating part of the inline swivel. The first fluid conduit can include a first launch valve located between the fluid supply conduit and the rotating part of the inline swivel. The second fluid conduit can be in fluid communication with the first fluid conduit and the rotating part of the toroidal swivel. The second fluid conduit can be in fluid communication with the first fluid conduit at a location located between the fluid supply conduit and the first launch valve. The second fluid conduit can include a second launch valve located between the first fluid conduit and the rotating part of the toroidal swivel. The third fluid conduit can be in fluid communication with the first fluid conduit and can be configured to be in fluid communication with a first fluid return conduit disposed on the first body. The third fluid conduit can be in fluid communication with the first fluid conduit at a location located between the first launch valve and the rotating part of the inline swivel. The third fluid conduit can include a first return valve located between the first fluid conduit and the first fluid return conduit. The fourth fluid conduit can be in fluid communication with the rotating part of the toroidal swivel and the third fluid conduit. The fourth fluid conduit can be in fluid communication with the third fluid conduit at a location located between the first fluid return conduit and the first return valve. The fourth fluid conduit can include a second return valve located between the rotating part of the toroidal swivel and the first fluid return conduit. The fifth fluid conduit can be in fluid communication with the fixed part of the inline swivel and can be configured to be in fluid communication with a fluid discharge conduit disposed on the second body. The fifth fluid conduit can include a third launch valve located between the fixed part of the inline swivel and the fluid discharge conduit. The sixth fluid conduit can be in fluid communication with the fixed part of the toroidal swivel and the fifth fluid conduit, wherein the sixth fluid conduit can be in fluid communication with the fifth fluid conduit at a location located between the fluid discharge conduit and the third launch valve. The sixth fluid conduit can include a fourth launch valve located between the fixed part of the toroidal swivel and the fluid discharge conduit. The seventh fluid conduit can be in fluid communication with the fifth fluid conduit and can be configured to be in fluid communication with a second fluid return conduit disposed on the second body. The seventh fluid conduit can be in fluid communication with the fifth fluid conduit at a location located between the third launch valve and the fixed part of the inline swivel. The seventh fluid conduit can include a third return valve located between the fifth fluid conduit and the second fluid return conduit. The eighth fluid conduit can be in fluid communication with the fixed part of the toroidal swivel and the seventh fluid conduit. The eighth fluid conduit can be in fluid communication with the seventh fluid conduit at a location located between the second fluid return conduit and the third return valve. The eighth fluid conduit can include a fourth return valve located between the fixed part of the toroidal swivel and the second fluid return conduit. The process can also include placing the system into a launch mode. The process can also include flowing a fluid from the fluid supply line to displace the pig from the first fluid conduit toward the inline swivel. The process can also include flowing the fluid until the pig has passed the third launch valve. In some embodiments, the process can also include placing the system into a receive mode. In some embodiments, the process can also include flowing the fluid until the pig has entered the third fluid conduit.

BRIEF DESCRIPTION OF THE DRAWINGS

The various aspects and advantages of the preferred embodiment of the present invention will become apparent to those skilled in the art upon an understanding of the following detailed description of the invention, read in light of the accompanying drawings which are made a part of this specification.

DETAILED DESCRIPTION

Figure 1:
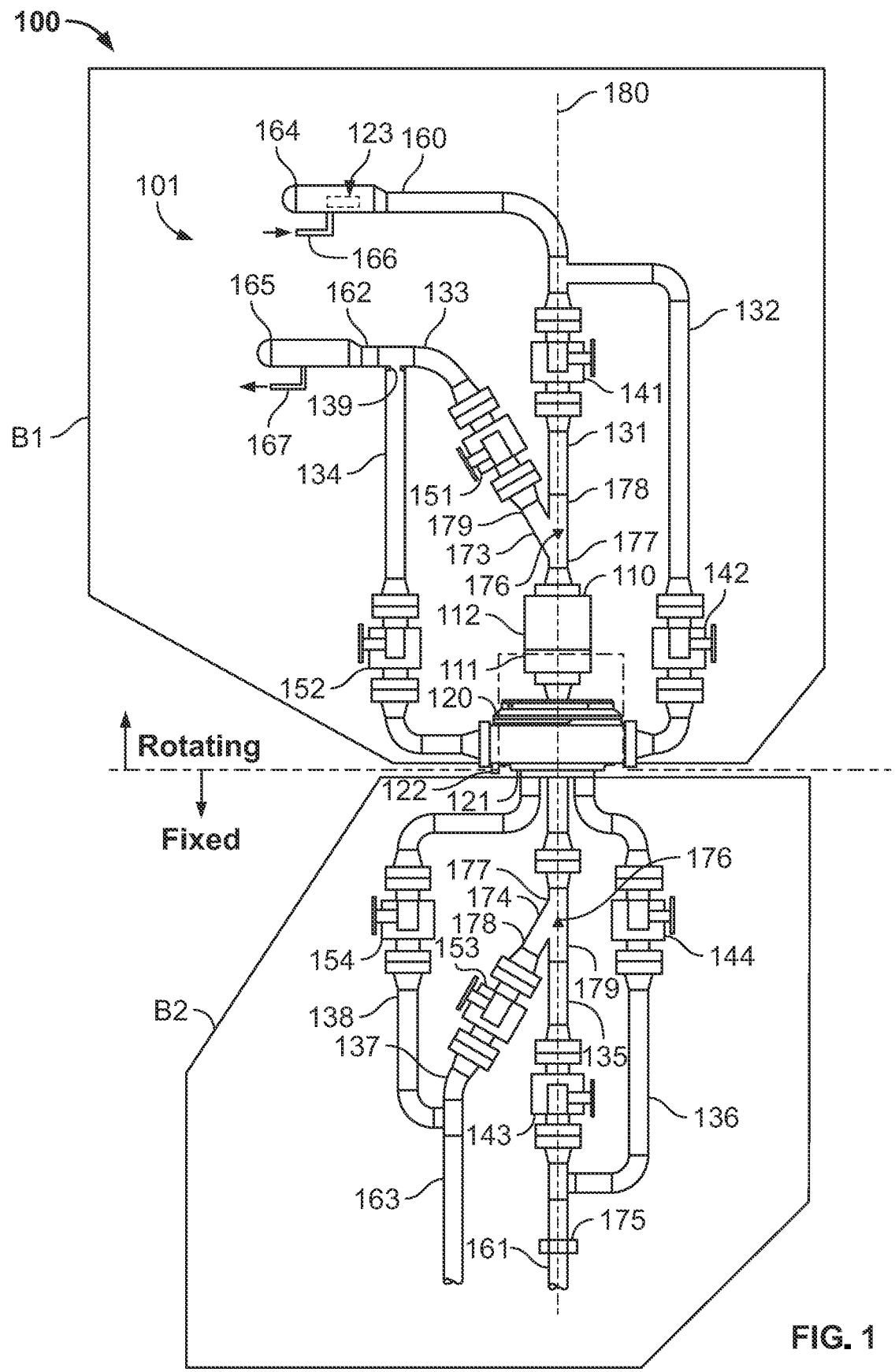
FIG. 1 depicts an illustrative turret mooring system configured to facilitate round trip pigging operations from a first body rotatively coupled to a second body, according to one or more embodiments described.

A detailed description will now be provided. Each of the appended claims defines a separate invention, which for infringement purposes is recognized as including equivalents to the various elements or limitations specified in the claims. Depending on the context, all references to the "invention", in some cases, refer to certain specific or preferred embodiments only. In other cases, references to the "invention" refer to subject matter recited in one or more, but not necessarily all, of the claims. It is to be understood that the following disclosure describes several exemplary embodiments for implementing different features, structures, or functions of the invention. Exemplary embodiments of components, arrangements, and configurations are described below to simplify the present disclosure; however, these exemplary embodiments are provided merely as examples and are not intended to limit the scope of the invention. Additionally, the present disclosure may repeat reference numerals and/or letters in the various exemplary embodiments and across the figures provided herein. This repetition is for the purpose of simplicity and clarity and does not in itself dictate a relationship between the various exemplary embodiments and/or configurations discussed in the Figures. Moreover, the formation of a first feature over or on a second feature in the description that follows includes embodiments in which the first and second features are formed in direct contact and also includes embodiments in which additional features are formed interposing the first and second features, such that the first and second features are not in direct contact. The exemplary embodiments presented below may be combined in any combination of ways, i.e., any element from one exemplary embodiment may be used in any other exemplary embodiment, without departing from the scope of the disclosure. The figures are not necessarily drawn to scale and certain features and certain views of the figures can be shown exaggerated in scale or in schematic for clarity and/or conciseness.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Also, the naming convention used herein is not intended to distinguish between components that differ in name but not function. Furthermore, in the following discussion and in the claims, the terms "including" and "comprising" are used in an open-ended fashion, and thus should be interpreted to mean "including, but not limited to."

All numerical values in this disclosure are exact or approximate values ("about") unless otherwise specifically stated. Accordingly, various embodiments of the disclosure may deviate from the numbers, values, and ranges disclosed herein without departing from the intended scope.

Further, the term "or" is intended to encompass both exclusive and inclusive cases, i.e., "A or B" is intended to be synonymous with "at least one of A and B," unless otherwise expressly specified herein. The indefinite articles "a" and "an" refer to both singular forms (i.e., "one") and plural referents (i.e., one or more) unless the context clearly dictates otherwise. The terms "up" and "down"; "upward" and "downward"; "upper" and "lower"; "upwardly" and "downwardly"; "above" and "below"; and other like terms used herein refer to relative positions to one another and are not intended to denote a particular spatial orientation since the apparatus and methods of using the same may be equally effective at various angles or orientations.

Figure 2:
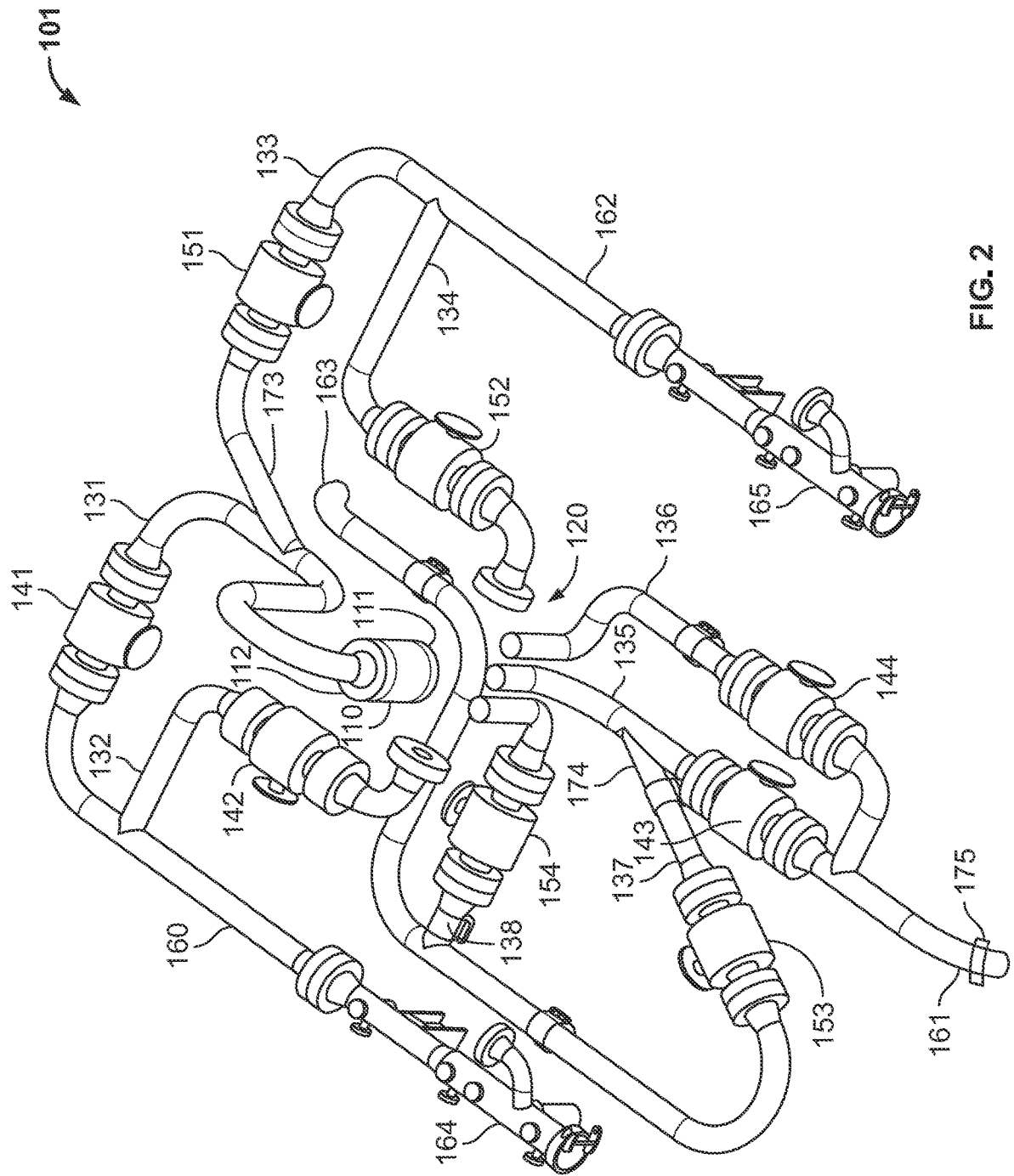
FIG. 2 depicts an isometric view of a piping system shown in FIG. 1 with a toroidal swivel omitted for clarity.

FIG. 1 depicts an illustrative turret mooring system 100 configured to facilitate round trip pigging operations from a first body B1 rotatively coupled to a second body B2. FIG. 2 depicts an isometric view of a piping system 101 shown in FIG. 1 with a toroidal swivel 120 omitted for clarity. Referring to FIGS. 1 and 2, in some embodiments, the first body B1 can be configured as a rotating part of the turret mooring system 100. The second body B2 can be configured to be substantially rotationally fixed relative to the earth. In other words, the second body B2 can be configured to be substantially rotationally fixed about a vertical axis 180 relative to the earth. As used herein, the term "substantially rotationally fixed" means that the second body B2 can rotate about the vertical axis 180 relative to the earth by about +/−45° or less, about +/−40° or less, about +/−35° or less, about +/−30° or less, about +/−25° or less, about +/−20° or less, about +/−15° or less, or about +/−10° or less.

In some embodiments, a floating vessel such as a floating storage and offloading (FSO) vessel, a floating production storage and offloading (FPSO) vessel, a floating liquefied natural gas (FLNG) vessel, or other similar vessel can be attached to the first body B1, i.e., the rotating part of the turret mooring system 100. In some embodiments, the first body B1 can be configured to be disposed on and secured to a floating structure. In some embodiments, the floating structure can be a floating vessel, for example an FSO, FPSO, FLNG, or any other floating vessel. In other embodiments, the first body B1 can be configured to be disposed on and secured to a fixed structure. In some embodiments the fixed structure can be a tower, platform, or other structure and a floating vessel can be configured to be moored to the first body B1 and the first body B1 and the floating vessel can be configured to rotate about the fixed structure and the second body B2.

The turret mooring system 100 can include an inline swivel 110 that can include a fixed part 111 and a rotating part 112. The fixed part 111 of the inline swivel 110 can be connected to the second body B2 and the rotating part 112 of the inline swivel 110 can be connected to the first body B1. The inline fluid swivel 110 can be configured to maintain fluid communication between the fixed part 111 and the rotating part 112 while the rotating part 112 rotates relative to the fixed part 111. In some embodiments, the inline fluid swivel 110 can be configured to permit passage of a pipeline inspection gauge or "pig" 123 therethrough.

In some embodiments the pig 123 can be spherically shaped or substantially spherically shaped. In some embodiments, the pig 123 can have a diameter that can be slightly less than an inner diameter of the inline swivel 110. For example, the pig 123 can have a diameter that can be equal to about 90%, about 93%, about 95%, about 97%, or about 99% of the inner diameter of the inline swivel 110. In other embodiments, the pig 123 can have an oblong or elongated shape. For example, the pig 123 can have a length that can be greater than an inside diameter of the inline swivel 110, such as an "intelligent" pig. In some embodiments, the pig 123 can have a length that can be about 1.1, about 1.5, about 2, about 3, about 4, about 5, or even about 6 times or more than the inside diameter of the inline swivel 110. In other embodiments, the pig 123 can be configured as an intelligent inspection pig or a scraper pig that can have an expandable, e.g., spring loaded, outer surface such that the outer diameter of the pig 123 can match an inner diameter of the inline swivel 110.

In some embodiments, the turret mooring system 100 can also include a toroidal swivel 120 that can include a fixed part 121 and a rotating part 122. The fixed part 121 of the toroidal swivel 120 can be connected to the second body B2 and the rotating part 122 of the toroidal swivel 120 can be connected to the first body B1. In some embodiments, the toroidal swivel 120 can be configured to maintain fluid communication between the fixed part 121 and the rotating part 122 when the rotating part 122 rotates relative to the fixed part 121. In some embodiments, the turret mooring system 100 can be configured such that the rotating part 112 of the inline swivel 110 and the rotating part 122 of the toroidal swivel 120 can each be configured to rotate about the axis 180 that can be collinear with a longitudinal axis of the inline swivel 110 and a longitudinal axis of the toroidal swivel 120.

In some embodiments, the turret mooring system 100 can include a first fluid conduit 131 that can include a first launch valve or "first valve" 141 that can be configured to be in fluid communication with a fluid supply conduit 160 disposed on the first body B1 and the rotating part 112 of the inline swivel 110. In some embodiments, at least a portion of a fluid can be introduced into the fluid supply conduit 160 via conduit 166. In some embodiments, the turret mooring system 100 can include a second fluid conduit 132 that can include a second launch valve or "second valve" 142 that can be in fluid communication with the rotating part 122 of the toroidal swivel 120 and the first fluid conduit 131. In some embodiments, the second fluid conduit 132 can be in fluid communication with the first fluid conduit 131 at a location located between the fluid supply conduit 160 and the first launch valve 141. In some embodiments, the turret mooring system 100 can include a third fluid conduit 133 that can include a first return valve or "third valve" 151 that can be in fluid communication with the first fluid conduit 131 and configured to be in fluid communication with a first fluid return conduit 162 disposed on the first body B1. In some embodiments, the third fluid conduit 133 can be in fluid communication with the first fluid conduit 131 at a location located between the first launch valve 141 and the rotating part 112 of the inline swivel 110. In some embodiments, at least a portion of a fluid introduced into the first fluid return line 162 can be removed therefrom via conduit 167. In some embodiments, the turret mooring system 100 can include a fourth fluid conduit 134 that can include a second return valve or "fourth valve" 152 that can be in fluid communication with the rotating part 122 of the toroidal swivel 120 and the third fluid conduit 133. In some embodiments, the fourth fluid conduit 134 can be in fluid communication with the third fluid conduit 133 at a location located between the first fluid return conduit and the first return valve 151.

In some embodiments, the turret mooring system 100 can include a fifth fluid conduit 135 that can include a third launch valve or "fifth valve" 143 that can be in fluid communication with the fixed part 111 of the inline swivel 110 and configured to be in fluid communication with a fluid discharge conduit 161 disposed on the second body B2. In some embodiments, the turret mooring system 100 can include a sixth fluid conduit 136 that can include a fourth launch valve of "sixth valve" 144 that can be in fluid communication with the fixed part 121 of the toroidal swivel 120 and the fifth fluid conduit 135. In some embodiments, the sixth fluid conduit 136 can be in fluid communication with the fifth fluid conduit 135 at a location located between the fluid discharge conduit 161 and the third launch valve 143. In some embodiments, the turret mooring system 100 can include a seventh fluid conduit 137 that can include a third return valve or "seventh valve" 153 that can be in fluid communication with the fifth fluid conduit 135 and configured to be in fluid communication with a second fluid return conduit 163 disposed on the second body B2. In some embodiments, the seventh fluid conduit 137 can be in fluid communication with the fifth fluid conduit 135 at a location located between the third launch valve 143 and the fixed part 111 of the inline swivel 110. In some embodiments, the turret mooring system 100 can include an eighth fluid conduit 138 that can include a fourth return valve or "eighth valve" 154 that can be in fluid communication with the fixed part 121 of the toroidal swivel 120 and the seventh fluid conduit 137. In some embodiments, the eighth fluid conduit 138 can be in fluid communication with the seventh fluid conduit 137 at a location located between the second fluid return conduit 163 and the third return valve 153.

In some embodiments, the fixed part 111 of the inline swivel 110 and the rotating part 112 of the inline swivel 110 can be configured to maintain fluid communication between the first fluid conduit 131 and the fifth fluid conduit 135 as the first body B1 rotates relative to the second body B2. In some embodiments, the fixed part 121 of the toroidal swivel 120 and the rotating part 122 of the toroidal swivel 120 can be configured to maintain fluid communication between the second fluid conduit 132, the fourth fluid conduit 134, the sixth fluid conduit 136, and the eighth fluid conduit 138 as the first body B1 rotates relative to the second body B2. In such embodiments, the toroidal swivel 120 can include one toroidal flow path that can provide fluid communication between the second fluid conduit 132, the fourth fluid conduit 134, the sixth fluid conduit 136, and the eighth fluid conduit 138 as the first body B1 rotates relative to the second body B2.

In other embodiments, the toroidal swivel 120 can be configured to maintain fluid communication between the second fluid conduit 132 and the sixth fluid conduit 136 and to separately maintain fluid communication between the fourth fluid conduit 134 and the eighth fluid conduit 138. In such embodiments, the toroidal swivel 120 can include a first toroidal flow path configured to provide fluid communication between the second fluid conduit 132 and the six fluid conduit 136 and a second toroidal flow path configured to provide fluid communication between the fourth fluid conduit 134 and the eighth fluid conduit 138. In other such embodiments, the toroidal swivel 120 can be two separate toroidal swivels that can include the fixed parts 121 thereof connected to one another.

In some embodiments, the third fluid conduit 133 can be in fluid communication with the first fluid conduit 131 via a first piggable wye 173. In some embodiments, the seventh fluid conduit 137 can be in fluid communication with the fifth fluid conduit 135 via a second piggable wye 174. In some embodiments, the first piggable wye 173 and the second piggable wye 174 can each be configured with an inlet/outlet 177, an inlet 178, and an outlet 179. In other embodiments, the first piggable wye 173 can be configured with an inlet/outlet 177, an inlet 178, and an outlet 179 and the second piggable wye 174 can be configured with an inlet/outlet 177, an outlet 178, and an inlet 179. Whether 178 and 179 in the second piggable wye 174 can depend on the particular route the pig 123 can exit the second piggable wye 174 and reenter the second piggable wye 174 during a launch mode and a receive mode.

In some embodiments, the first piggable wye 173 and the second piggable wye 174 can each be configured with a switch 176 that can be configured to direct the pig 123 therethrough. For example, when the turret mooring system 100 is in a launch mode (described in more detail below), the switch 176 in the second piggable wye 174 can ensure the pig 123 travels through the outlet 179 of the second piggable wye 174. In another example, when the turret mooring system 100 is in a return mode (described in more detail below) the switch 176 in the first piggable wye 173 can ensure the pig 123 travels through the outlet 179 of the first piggable wye 173. In some embodiments, the switch 176 in the first piggable wye 173 and the switch 176 in the second piggable wye 174 can independently be configured as an internal gate or guide structure that can be positioned in a first position or a second position to direct the pig 123 therethrough via a desired path, as described in more detail below.

In some embodiments, the first launch valve 141, the third launch valve 143, the first return valve 151, and the third return valve 153 can each independently be configured as through conduit valves, e.g., a ball valve or a through conduit gate valve. In some embodiments, the second launch valve 142, the fourth launch valve 144, the second return valve 152, and the fourth return valve 154 can each independently be configured as through conduit valves, e.g., a ball valve, a through conduit gate valve, a gate valve, or a butterfly valve.

In some embodiments, the turret mooring system 100 can further include a pig detector 175. In some embodiments the pig detector 175 can be disposed on the fluid discharge conduit 161, as shown, on the fifth fluid conduit 131, on the first fluid conduit 131, or on the fifth fluid conduit 135. In other embodiments, the pig detector 175 or another pig detector 175 can be disposed on the third fluid conduit 133, the first fluid return conduit 162, the second fluid return conduit 163, or the seventh fluid conduit 137. In some embodiments, the turret mooring system 100 can include two or more pigs 175 arranged in any desired configuration.

In some embodiments, the pig detector 175 can detect when the pig 123 has passed by the pig detector 175.

In some embodiments, an optional pig launcher 164 can be in fluid communication with the fluid supply conduit 160 and/or with the first fluid conduit 131. In some embodiments, an optional pig receiver 165 can be in fluid communication with the first fluid return conduit 162 and/or with the third fluid conduit 133. The pig launcher 164 can be configured to introduce the pig 123 into the fluid supply conduit 160 or the first fluid conduit 131. In some embodiments, the pig receiver 165 can be configured to receive the pig 123 from the third fluid conduit 133 or the first fluid return conduit 162. In some embodiments, the pig launcher 164 and/or the pig receiver 165 can be disposed on the first body B1. In some embodiments, the pig launcher 164 and/or the pig receiver 165 can be disposed on a floating vessel, e.g., a deck of the floating vessel, or any other structure to which the first body B1 may be attached.

In some embodiments, the turret mooring system 100 can be configured in a pig launch mode, a pig receive mode, or a non-launch/non-receive mode, which can also be referred to a normal operating or normal production mode. In some embodiments the turret mooring system 100 can be configured in the pig launch mode when the first launch valve 141 is open, the second launch valve 142 is closed, the third launch valve 143 is open, the fourth launch valve 144 is closed, the first return valve 151 is closed, the second return valve 152 is open, the third return valve 153 is closed, and the fourth return valve 154 is open. In other embodiments the turret mooring system 100 can be configured in the pig launch mode when the first launch valve 141 is open, the second launch valve 142 is closed, the third launch valve 143 is closed, the fourth launch valve 144 is open, the first return valve 151 is closed, the second return valve 152 is open, the third return valve 153 is open, and the fourth return valve 154 is closed.

In some embodiments, the turret mooring system 100 can be configured in the pig receive mode when the first launch valve 141 is closed, the second launch 142 valve is open, the third launch valve 143 is closed, the fourth launch 144 valve is open, the first return valve 151 is open, the second return valve 152 is closed, the third return valve 153 is open, and the fourth return valve 154 is closed. In other embodiments, the turret mooring system 100 can be configured in the pig receive mode when the first launch valve 141 is closed, the second launch 142 valve is open, the third launch valve 143 is open, the fourth launch 144 valve is closed, the first return valve 151 is open, the second return valve 152 is closed, the third return valve 153 is closed, and the fourth return valve 154 is open.

In some embodiments, the turret mooring system 100 can be configured in the non-launch/non-receive mode when the first launch valve 141 is open, the second launch valve 142 is closed, the third launch valve 143 is open, the fourth launch valve 144 is closed, the first return valve 151 is closed, the second return valve 152 is open, the third return valve 153 is closed, and the fourth return valve 154 is open.

In some embodiments, when the turret mooring system 100 is in the launch mode, the switch 176 in the first piggable wye 173 can be configured to direct the pig 123 from the inlet 178 into the inlet/outlet 177 and the switch 176 in the second piggable wye 174 can be configured to direct the pig 123 from the inlet/outlet 177 into the outlet 179. In some embodiments, when the turret mooring system 100 is in the receive mode, the switch 176 in the second piggable wye 174 can be configured to direct the pig 123 from the inlet 178 into the inlet/outlet 177 and the switch 176 in the first piggable wye 173 can be configured to direct the pig from the inlet/outlet 177 into the outlet 179.

In some embodiments, the system 100 can include a structure 139 that can be configured to prevent the pig 123 from traveling from the third fluid conduit 133 into the fourth fluid conduit 134, as shown in FIG. 1, and/or from the first fluid conduit 131 into the second fluid conduit 132, and/or from the fifth fluid conduit 135 into the sixth fluid conduit 136, and/or from the seventh fluid conduit 137 into the eighth fluid conduit 138. In some embodiments, the structure 139 can be disposed within the fourth fluid conduit 134, as shown. In other embodiments, the structure 139 can be disposed within the third fluid conduit 133. In still other embodiments, the structure 139 can be partially disposed within the fourth fluid conduit 134 and partially disposed within the third fluid conduit 133. When additional structures 139 are present to prevent the pig 123 from traveling from the first fluid conduit 131 into the second fluid conduit 132, and/or from the fifth fluid conduit 135 into the sixth fluid conduit 136, and/or from the seventh fluid conduit 137 into the eighth fluid conduit 138, such additional structures 139 can be disposed within the conduits in the same or similar manner as structure 139, i.e., within one of the fluid conduits or partially within both of the fluid conduits.

In some embodiments, the structure 139 can be or can include, but is not limited to, one or more bars, one or more plates, a gate, a grate, a screen, or any other member. The structure 1139 can have any configuration that allows fluid to pass between the fluid conduits while preventing the pig 123 from passing from one conduit into the other conduit. The structure 139 can be secured, fixed, attached, or otherwise connected to an inner wall or surface of the conduit(s) via any suitable manner. In some embodiments, the structure 139 can be integral with the conduit(s), e.g., via casting, molding, milling, or the like. In other embodiments, the structure 139 can be connected to the conduit(s) via welding, one or more mechanical fasteners, e.g., bolts, bolts and nuts, screws, rivets, or the like, brazing, and the like. The structure 139 can be formed from one or more metals, e.g., aluminum, one or more metal alloys, e.g., stainless steel, one or more polymers, or any other suitable material. In some embodiments, the structure 139 can be the same as or similar to the structures disclosed in U.S. Provisional Patent Application No. 63/612,588.

In some embodiments, the system 100 can be configured such that an inner diameter of the second fluid conduit 132, an inner diameter of the fourth fluid conduit 134, an inner diameter of the sixth fluid conduit 136, and/or an inner diameter of the eighth fluid conduit 138 can be less than an outer diameter of the pig 123 to prevent the pig 123 from entering or traveling into the second fluid conduit 132, and/or the fourth fluid conduit 134, and/or the sixth fluid conduit 136, and/or the eighth fluid conduit 138.

Figure 3:
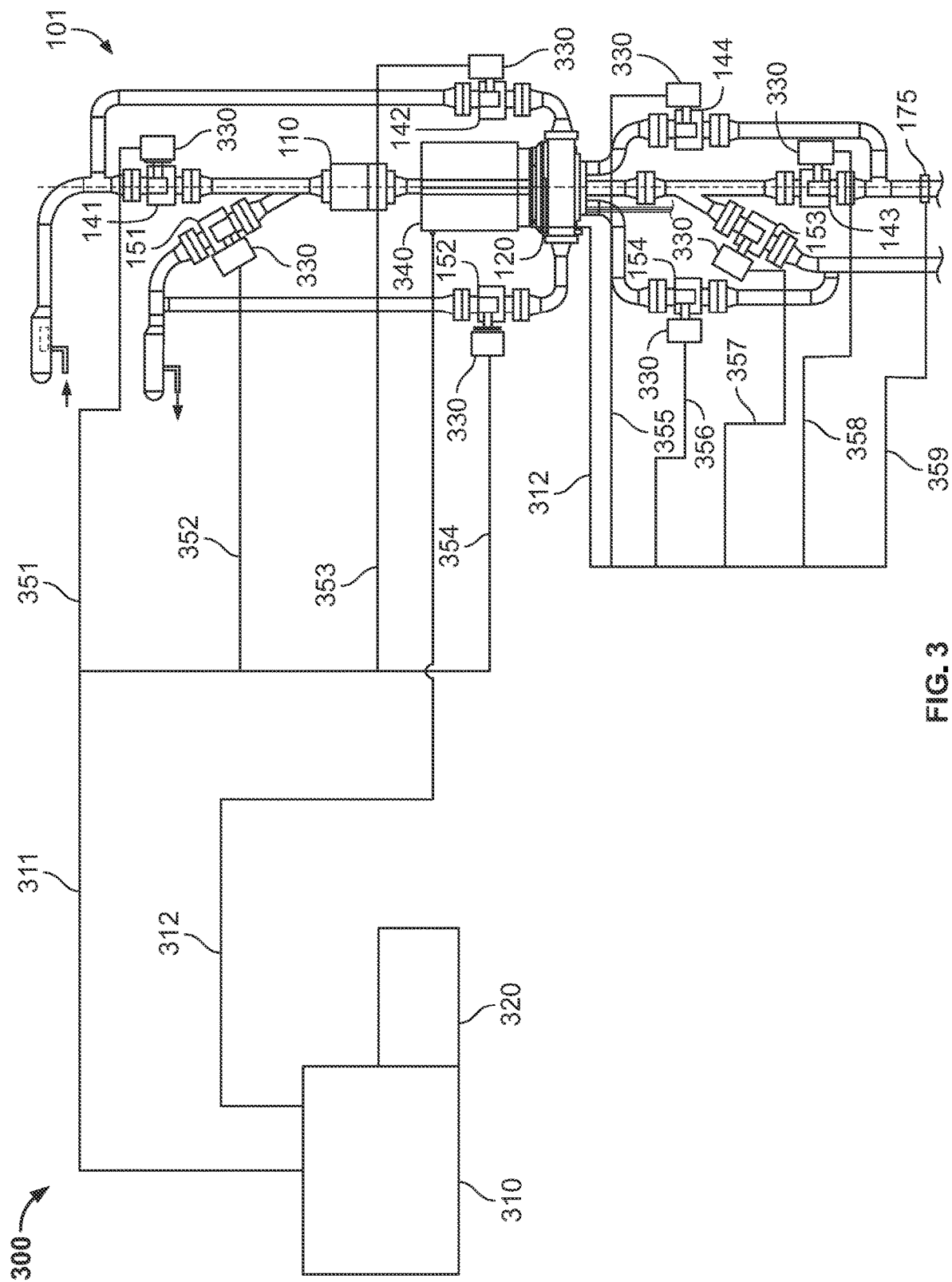
FIG. 3 depicts a diagram of an illustrative control system configured to operate a turret mooring system configured to facilitate round trip pigging operations from a first body rotatively coupled to a second body, according to one or more embodiments described.

FIG. 3 depicts a diagram of a control system 300 configured to operate the turret mooring system 100 that can be configured to facilitate round trip pigging operations from the first body B1 rotatively coupled to the second body B2 (see FIG. 1). In some embodiments, the first launch valve 141, the second launch valve 142, the third launch valve 143, the fourth launch valve 144, the first return valve 151, the second return valve 152, the third return valve 153, and the fourth return valve 154 can each be configured with a controllable actuator 330. In some embodiments, the actuators 330 can independently be hydraulically powered, pneumatically powered, or electrically powered. The control system 300 can include a power unit 310, for example an air compressor, a hydraulic power unit, or an electric power unit such as a generator, and a logic controller 320, for example a programmable logic controller (PLC).

In some embodiments, the controllable actuators 330 can be in communication with the control system 300, the power unit 310, and/or the control unit 320. In some embodiments, a first conduit bundle 311 can be in communication with the power unit 310 and can include a first control or power conduit 351, a second control or power conduit 352, a third control or power conduit 353, a fourth control or power conduit 354. The first, second, third, and fourth control or power conduits 351, 352, 353, and 354 can be in communication with the controllable actuators 330 configured to operate the first launch valve 141, the second launch valve 142, the first return valve 151, and the second return valve 152, respectively. In some embodiments, a second conduit bundle 312 can be in communication with the power unit 310 and an include a fifth control or power conduit 355, a sixth control or power conduit 356, a seventh control or power conduit 357, and an eighth control or power conduit 358. In some embodiments, the second conduit bundle 312 can also include a ninth control or power conduit 359 that can connect the pig detector 175 with the control system 300.

In some embodiments, the logic controller 320 can be tied into or otherwise linked to a central control unit disposed on the vessel, not shown. In some embodiments, the power unit 310 and the control unit 320 can be disposed on the first body B1 (see FIG. 1). In some embodiments, the turret mooring system 100 can further include a swivel 340, e.g., a utility swivel, an electric swivel, and/or a fiber optic swivel, that can be configured to transmit power, for example hydraulic power or air power from the power unit 310 disposed on the first body B1 across the rotary boundary (see FIG. 1) to the controllable actuators 330 disposed on the second body B2. In some embodiments, the swivel 340 can be configured to transmit control signals from the turret mooring system 100 to the control unit 320 or from the control unit 320 to the turret mooring system 100. For example, signals from the pig detector 175 can be transmitted to the control unit 320 and vice versa. In some embodiments, the fifth control or power conduit 355, the sixth control or power conduit 356, the seventh control or power conduit 357, the eighth control or power conduit 358, and the ninth control or power conduit 359 can be in communication with the control system 300 via the swivel 340. As shown, the second conduit bundle 312 can pass through the swivel 340 and then be separated and connected to the controllable actuators 330 or the pig detector. In other embodiments, each of the control or power conduits 355, 356, 357, 358, and 359 can pass through separate paths of the swivel 340 and/or pass through two or more paths of the swivel as separate smaller conduit bundles.

In some embodiments, the control system 300 can be configured to configure the turret mooring system 100 into the pig launch mode, the pig receive mode, or the non-launch/non-receive mode as appropriate. In some embodiments, the control system 300 can configure the turret mooring system 100 to switch from the non-launch/non-receive mode into the launch mode to initiate launching of the pig 123. Once the pig detector 175 detects the pig 123 has passed thereby, the control system 300 can configure the turret mooring system 100 to switch from the launch mode to the receive mode. In some embodiments, a second pig detector 175 can be located on the third fluid conduit 133 or the first fluid return conduit 162 and, upon detecting the return of the pig 123, the control system 300 can configure the turret mooring system 100 to switch from the receive mode to the non-launch/non-receive mode or back to the launch mode. In other embodiments, personnel can manually confirm the pig 123 has returned after initiating the launch mode and can manually input such return into the control system 300.

Figure 4:
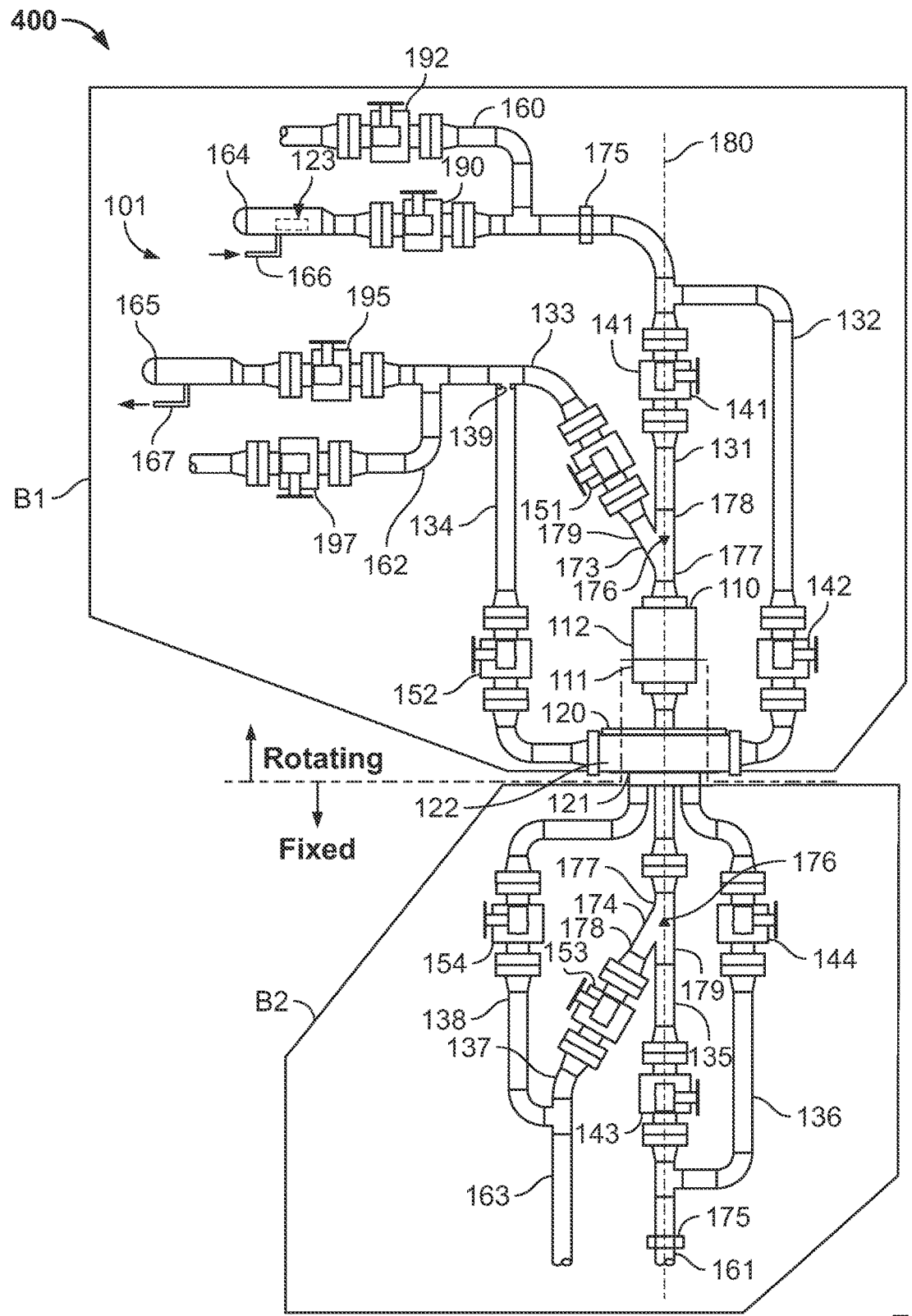
FIG. 4 depicts another illustrative turret mooring system configured to facilitate round trip pigging operations from a first body rotatively coupled to a second body, according to one or more embodiments described.

FIG. 4 depicts another illustrative turret mooring system 400 configured to facilitate round trip pigging operations from a first body B1 rotatively coupled to a second body B2, according to one or more embodiments. The turret mooring system 400 can be substantially similar to the turret mooring system 100 described above with reference to FIGS. 1 and 2. The first main difference between the turret mooring system 100 and the turret mooring system 400 is that the fluid supply conduit 160 can be in fluid communication with the first fluid conduit 131 and the optional pig launcher 164 can be in fluid communication with the fluid supply conduit 160 and the first fluid conduit 131. The second main difference between the turret mooring system 100 and the turret mooring system 400 is that the first fluid return conduit 162 can be in fluid communication with the third fluid conduit 133 and the fourth fluid conduit 134 and the optional pig receiver 165 can be in fluid communication with the first fluid return conduit 162.

The fluid supply conduit 160 can include a valve or "ninth valve" 192 that can be opened or closed as needed when the pig 123 is launched from the pig launcher 164, the pig 123 is returned to the pig receiver 165, and when the system is in the non-launch/non-receive mode. Similarly, the first fluid return conduit 162 can include a valve or "tenth valve" 197 that can be opened or closed as needed when the pig 123 is launched from the pig launcher 164, the pig 123 is returned to the pig receiver 165, and when the system is in the non-launch/non-receive mode. The pig launcher 164 can also include a valve or "eleventh valve" 190 that can be opened before the pig 123 is launched and closed thereafter. The pig receiver 165 can also include a valve or "twelfth valve" 195 that can be opened when the pig 123 is returned thereto and closed thereafter.

In some embodiments, the conduit 166 can introduce a fluid into the pig launcher 164 in an amount and flow rate sufficient to move the pig 123 into the first conduit 131. Once the pig 123 has been introduced into the first conduit 131, valve 190 can be closed and valve 192 can be opened to allow fluid from the fluid supply conduit 160 to flow into the first fluid conduit 131 to move the pig 123 therethrough. In some embodiments, when the pig 123 is conveyed toward the pig receiver 165, valve 195 can be opened and once the pig 123 enters the pig receiver 165 the valve 195 can be closed. The conduit 167 can allow for fluid conveyed into the pig receiver 165 to be removed therefrom. In some embodiments, when the pig 123 is conveyed into the pig receiver 165, valve 197 can be opened or at least partially opened so that at least some of the fluid used to move the pig 123 from the third fluid conduit 133 into the pig receiver 165 can flow into the fluid return conduit 162.

A second pig detector 175, as shown in FIG. 4, can also be located between the first fluid conduit 131 and the fluid supply conduit 160 and the pig launcher 164. Additional pig detectors 175 can be located about the conduits of the turret mooring system 400, as described above with reference to FIGS. 1 and 2. The turret mooring system 400 can also include one or more of the structures 139 that can partially obstruct the fluid communication between any one or more of the intersections of the various conduits, as described above with reference to FIGS. 1 and 2.

In some embodiments a process for performing a pigging operation from a first body B1 rotatively coupled to a second body B2 can include inserting a pig 123 into the first fluid conduit 131 or the fluid supply conduit 160 disposed on the first body B1, configuring the turret mooring system 100 into the launch mode, flowing a fluid from the fluid supply line 160 to displace the pig 123 from the first fluid conduit 131 or the fluid supply conduit 160 toward the inline swivel 110, and flowing the fluid until the pig 123 passes the third launch valve 143. Once the pig 123 has passed the third launch valve 143, the turret mooring system 100 can be configured in the receive mode. The process can include flowing fluid through the second fluid return conduit 163 until the pig 123 enters the first fluid return line 162. In some embodiments the step of inserting the pig 123 into the first fluid conduit can include the step of loading the pig into the pig launcher 164. In some embodiments, the step of receiving the pig 123 can include receiving the pig 123 with the pig receiver 165. In some embodiments, the step of configuring the turret mooring system 100 in the receive mode can be performed by the control system 300 when the pig detector 175 detects the presence of the pig 123 in the fifth fluid conduit 135 after the pig 123 has passed the third launch valve 143. In other embodiments, the step of configuring the turret mooring system 100 in the receive mode can be performed by the control system 300 after a time interval after the step of flowing the fluid from the fluid supply line to displace the pig from the first fluid conduit toward the inline swivel. In some embodiments, the time interval can be calculated by the length of the pigging loop or the length of the round-trip path and the flow velocity.

The present disclosure further relates to any one or more of the following numbered embodiments:

A1. A system for pigging between a first body rotatively coupled to a second body, comprising: an inline swivel comprising a fixed part and a rotating part, wherein the fixed part of the inline swivel is configured to be connected to the second body and the rotating part of the inline swivel is configured to be connected to the first body; a toroidal swivel comprising a fixed part and a rotating part, wherein the fixed part of the toroidal swivel is configured to be connected to the second body and the rotating part of the toroidal swivel is configured to be connected to the first body; a first fluid conduit configured to be in fluid communication with a fluid supply conduit disposed on the first body and the rotating part of the inline swivel, wherein the first fluid conduit comprises a first launch valve located between the fluid supply conduit and the rotating part of the inline swivel; a second fluid conduit in fluid communication with the first fluid conduit and the rotating part of the toroidal swivel, wherein the second fluid conduit is in fluid communication with the first fluid conduit at a location located between the fluid supply conduit and the first launch valve, and wherein the second fluid conduit comprises a second launch valve located between the first fluid conduit and the rotating part of the toroidal swivel; a third fluid conduit in fluid communication with the first fluid conduit and configured to be in fluid communication with a first fluid return conduit disposed on the first body, wherein the third fluid conduit is in fluid communication with the first fluid conduit at a location located between the first launch valve and the rotating part of the inline swivel, and wherein the third fluid conduit comprises a first return valve located between the first fluid conduit and the first fluid return conduit; a fourth fluid conduit in fluid communication with the rotating part of the toroidal swivel and the third fluid conduit, wherein the fourth fluid conduit is in fluid communication with the third fluid conduit at a location located between the first fluid return conduit and the first return valve, and wherein the fourth fluid conduit comprises a second return valve located between the rotating part of the toroidal swivel and the first fluid return conduit; a fifth fluid conduit in fluid communication with the fixed part of the inline swivel and configured to be in fluid communication with a fluid discharge conduit disposed on the second body, wherein the fifth fluid conduit comprises a third launch valve located between the fixed part of the inline swivel and the fluid discharge conduit; a sixth fluid conduit in fluid communication with the fixed part of the toroidal swivel and the fifth fluid conduit, wherein the sixth fluid conduit is in fluid communication with the fifth fluid conduit at a location located between the fluid discharge conduit and the third launch valve, and wherein the sixth fluid conduit comprises a fourth launch valve located between the fixed part of the toroidal swivel and the fluid discharge conduit; a seventh fluid conduit in fluid communication with the fifth fluid conduit and configured to be in fluid communication with a second fluid return conduit disposed on the second body, wherein the seventh fluid conduit is in fluid communication with the fifth fluid conduit at a location located between the third launch valve and the fixed part of the inline swivel, and wherein the seventh fluid conduit comprises a third return valve located between the fifth fluid conduit and the second fluid return conduit; and an eighth fluid conduit in fluid communication with the fixed part of the toroidal swivel and the seventh fluid conduit, wherein the eighth fluid conduit is in fluid communication with the seventh fluid conduit at a location located between the second fluid return conduit and the third return valve, and wherein the eighth fluid conduit comprises a fourth return valve located between the fixed part of the toroidal swivel and the second fluid return conduit.

A2. The system of A1, wherein: the fixed part of the inline swivel and the rotating part of the inline swivel are configured to maintain fluid communication between the first fluid conduit and the fifth fluid conduit as the first body rotates relative to the second body, and the fixed part of the toroidal swivel and the rotating part of the toroidal swivel are configured to maintain fluid communication between the second fluid conduit, the fourth fluid conduit, the sixth fluid conduit and the eighth fluid conduit as the first body rotates relative to the second body.

A3. The system of A1, wherein: the fixed part of the inline swivel and the rotating part of the inline swivel are configured to maintain fluid communication between the first fluid conduit and the fifth fluid conduit as the first body rotates relative to the second body, and the fixed part of the toroidal swivel and the rotating part of the toroidal swivel are configured to maintain fluid communication between the second fluid conduit and the sixth fluid conduit and to separately maintain fluid communication between the fourth fluid conduit and the eighth fluid conduit.

A4. The system of any one of A1 to A3, wherein the rotating part of the inline swivel and the rotating part of the toroidal swivel are each configured to rotate about a longitudinal axis that is collinear with a longitudinal axis of the inline swivel, and a longitudinal axis of the toroidal swivel.

A5. The system of any one of A1 to A4, wherein the first body is a rotating part of a turret mooring system and the second body is a fixed part of the turret mooring system configured to be substantially rotationally fixed about a vertical axis relative to the earth.

A6. The system of any one of A1 to A4, wherein the first body is a vessel configured to float on a surface of a body of water and the second body is a fixed part of the turret mooring system configured to be substantially rotationally fixed about a vertical axis relative to the earth.

A7. The system of any one of A1 to A6, further comprising a control system, wherein the control system is configured to independently open and close the first launch valve, the second launch valve, the third launch valve, the fourth launch valve, the first return valve, the second return valve, the third return valve, and the fourth return valve.

A8. The system of any one of A1 to A7, further comprising a pig launcher configured to be disposed on the first body and configured to be in fluid communication with the first fluid conduit, and a pig receiver configured to be disposed on the first body and configured to be in fluid communication with the third fluid conduit.

A9. The system of any one of A1 to A8, wherein the third conduit is in fluid communication with the first conduit via a first piggable wye and the seventh fluid conduit is in fluid communication with the fifth fluid conduit via a second piggable wye.

A10. The system of A9, wherein the first piggable wye and the second piggable wye each comprise a switch configured to direct a pig therethrough.

A11. The system of any one of A1 to A6 or A8 to A10, further comprising a pig detector disposed on the fluid supply conduit, the first fluid conduit, the fifth fluid conduit, or the fluid discharge conduit and a control system, wherein the control system is configured to independently open and close the first launch valve, the second launch valve, the third launch valve, the fourth launch valve, the first return valve, the second return valve, the third return valve, and the fourth return valve and to receive a signal from the pig detector indicating that a pig has passed the pig detector.

A12. The system of A11, wherein the pig detector is disposed on the fifth fluid conduit or on the fluid discharge conduit.

A13. The system of A11 or A12, wherein the control system is configured to place the system into a launch mode or into a receive mode.

A14. The system of A13, wherein the control system is configured to switch the system from the launch mode to the receive mode after the pig detector has detected that a pig has passed the pig detector.

A15. The system of any one of A11 to A14, wherein the system is in the launch mode when the first launch valve is open, the second launch valve is closed, the third launch valve is open, the fourth launch valve is closed, the first return valve is closed, the second return valve is open, the third return valve is closed and the fourth return valve is open, and the system is in the receive mode when the first launch valve is closed, the second launch valve is open, the third launch valve is closed, the fourth launch valve is open, the first return valve is open, the second return valve is closed, the third return valve is open, and the fourth return valve is closed.

A16. The system of any one of A11 to A14, wherein the system is in the launch mode when the first launch valve is open, the second launch valve is closed, the third launch valve is closed, the fourth launch valve is open, the first return valve is closed, the second return valve is open, the third return valve is open and the fourth return valve is closed, and the system is in the receive mode when the first launch valve is closed, the second launch valve is open, the third launch valve is open, the fourth launch valve is closed, the first return valve is open, the second return valve is closed, the third return valve is closed, and the fourth return valve is open.

A17. The system of any one of A1 to A16, wherein the first launch valve, the third launch valve, the first return valve, and the third return valve are each independently a through conduit ball valve or a through conduit gate valve.

A18. The system of any one of A1 to A17, wherein the system further comprises a structure disposed within at least one of the second fluid conduit, the fourth fluid conduit, the sixth fluid conduit, and the eighth fluid conduit, wherein the structure is configured to prevent a pig from entering the second fluid conduit, the fourth fluid conduit, the sixth fluid conduit, and/or the eighth fluid conduit when the pig passes through the first fluid conduit, the third fluid conduit, the fifth fluid conduit, and/or the seventh fluid conduit, respectively.

A19. The system of any one of A1 to A17, wherein the system further comprises a structure disposed within the within at least one of the first fluid conduit, the third fluid conduit, the fifth fluid conduit, and the seventh fluid conduit, wherein the structure is configured to prevent a pig from entering the second fluid conduit, the fourth fluid conduit, the sixth fluid conduit, and/or the eighth fluid conduit when the pig passes through the first fluid conduit, the third fluid conduit, the fifth fluid conduit, and/or the seventh fluid conduit, respectively.

A20. The system of any one of A1 to A17, wherein the system further comprises at least one structure at least partially disposed within the first fluid conduit and the second fluid conduit, at least partially disposed within the third fluid conduit and the fourth fluid conduit, at least partially disposed within the fifth fluid conduit and the sixth fluid conduit, and/or at least partially disposed within the seventh fluid conduit and the eighth fluid conduit, wherein the structure is configured to prevent a pig from entering the second fluid conduit, the fourth fluid conduit, the sixth fluid conduit, and/or the eighth fluid conduit, respectively, when the pig passes through the first fluid conduit, the third fluid conduit, the fifth fluid conduit, and/or the seventh fluid conduit, respectively.

A21. The system of any one of A1 to A20, wherein an inner diameter of at least one of the second fluid conduit, the fourth fluid conduit, the sixth fluid conduit, and the eighth fluid conduit is less than an outer diameter of a pig configured to pass through the first fluid conduit, the fifth fluid conduit, the seventh fluid conduit, and the third fluid conduit such that the pig is prevented from entering the second fluid conduit, the fourth fluid conduit, the sixth fluid conduit, and/or the eighth fluid conduit.

B1. A process for pigging between a first body rotatively coupled to a second body of a system, comprising: inserting a pig into a first fluid conduit, wherein the system comprises: an inline swivel comprising a fixed part and a rotating part, wherein the fixed part of the inline swivel is configured to be connected to the second body and the rotating part of the inline swivel is configured to be connected to the first body; a toroidal swivel comprising a fixed part and a rotating part, wherein the fixed part of the toroidal swivel is configured to be connected to the second body and the rotating part of the toroidal swivel is configured to be connected to the first body; a first fluid conduit configured to be in fluid communication with a fluid supply conduit disposed on the first body and the rotating part of the inline swivel, wherein the first fluid conduit comprises a first launch valve located between the fluid supply conduit and the rotating part of the inline swivel; a second fluid conduit in fluid communication with the first fluid conduit and the rotating part of the toroidal swivel, wherein the second fluid conduit is in fluid communication with the first fluid conduit at a location located between the fluid supply conduit and the first launch valve, and wherein the second fluid conduit comprises a second launch valve located between the first fluid conduit and the rotating part of the toroidal swivel; a third fluid conduit in fluid communication with the first fluid conduit and configured to be in fluid communication with a first fluid return conduit disposed on the first body, wherein the third fluid conduit is in fluid communication with the first fluid conduit at a location located between the first launch valve and the rotating part of the inline swivel, and wherein the third fluid conduit comprises a first return valve located between the first fluid conduit and the first fluid return conduit; a fourth fluid conduit in fluid communication with the rotating part of the toroidal swivel and the third fluid conduit, wherein the fourth fluid conduit is in fluid communication with the third fluid conduit at a location located between the first fluid return conduit and the first return valve, and wherein the fourth fluid conduit comprises a second return valve located between the rotating part of the toroidal swivel and the first fluid return conduit; a fifth fluid conduit in fluid communication with the fixed part of the inline swivel and configured to be in fluid communication with a fluid discharge conduit disposed on the second body, wherein the fifth fluid conduit comprises a third launch valve located between the fixed part of the inline swivel and the fluid discharge conduit; a sixth fluid conduit in fluid communication with the fixed part of the toroidal swivel and the fifth fluid conduit, wherein the sixth fluid conduit is in fluid communication with the fifth fluid conduit at a location located between the fluid discharge conduit and the third launch valve, and wherein the sixth fluid conduit comprises a fourth launch valve located between the fixed part of the toroidal swivel and the fluid discharge conduit; a seventh fluid conduit in fluid communication with the fifth fluid conduit and configured to be in fluid communication with a second fluid return conduit disposed on the second body, wherein the seventh fluid conduit is in fluid communication with the fifth fluid conduit at a location located between the third launch valve and the fixed part of the inline swivel, and wherein the seventh fluid conduit comprises a third return valve located between the fifth fluid conduit and the second fluid return conduit; and an eighth fluid conduit in fluid communication with the fixed part of the toroidal swivel and the seventh fluid conduit, wherein the eighth fluid conduit is in fluid communication with the seventh fluid conduit at a location located between the second fluid return conduit and the third return valve, and wherein the eighth fluid conduit comprises a fourth return valve located between the fixed part of the toroidal swivel and the second fluid return conduit; placing the system into a launch mode; flowing a fluid from the fluid supply line to displace the pig from the first fluid conduit toward the inline swivel; and flowing the fluid until the pig has passed the third launch valve.

B2. The process of B1, further comprising placing the system into a receive mode.

B3. The process of B2, further comprising flowing the fluid until the pig has entered the third fluid conduit.

B4. The process of any one of B1 to B3, wherein placing the system into the launch mode comprises configuring the system such that the first launch valve is open, the second launch valve is closed, the third launch valve is open, the fourth launch valve is closed, the first return valve is closed, the second return valve is open, the third return valve is closed and the fourth return valve is open.

B5. The process of any one of B2 to B4, wherein placing the system into the receive mode comprises configuring the system such that the first launch valve is closed, the second launch valve is open, the third launch valve is closed, the fourth launch valve is open, the first return valve is open, the second return valve is closed, the third return valve is open, and the fourth return valve is closed.

B6. The process of any one of B1 to B5, wherein the system further comprises pig launcher in fluid communication with the fluid supply conduit, and wherein inserting the pig into the first fluid conduit comprises loading the pig into the pig launcher.

B7. The process of any one of B1 to B6, wherein the system further comprises a pig receiver in fluid communication with the third fluid conduit, the process further comprising receiving the pig with the pig receiver.

B8. The process of any one of B1 to B7, wherein the system further comprises a pig detector disposed on the fifth fluid conduit or the fluid discharge conduit, and wherein placing the system in the receive mode is performed by the control system after the pig detector detects the pig has passed the pig detector.

B9. The process of any one of B2 to B8, wherein the system further comprises a control system wherein the step of configuring the system in a receive mode is performed by the control system after a time interval after the step of flowing a fluid from the fluid supply line to displace the pig from the first fluid conduit toward the inline swivel.

Certain embodiments and features have been described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim can be not defined above, it should be given the broadest definition persons in the pertinent art have given that term as reflected in at least one printed publication or issued patent. Furthermore, all patents, test procedures, and other documents cited in this application are fully incorporated by reference to the extent such disclosure can be not inconsistent with this application and for all jurisdictions in which such incorporation can be permitted.

While certain preferred embodiments of the present invention have been illustrated and described in detail above, it can be apparent that modifications and adaptations thereof will occur to those having ordinary skill in the art. It should be, therefore, expressly understood that such modifications and adaptations may be devised without departing from the basic scope thereof, and the scope thereof can be determined by the claims that follow.

What is claimed is:

1. A system for pigging between a first body rotatively coupled to a second body, comprising:
an inline swivel comprising a fixed part and a rotating part, wherein the fixed part of the inline swivel is configured to be connected to the second body and the rotating part of the inline swivel is configured to be connected to the first body;
a toroidal swivel comprising a fixed part and a rotating part, wherein the fixed part of the toroidal swivel is configured to be connected to the second body and the rotating part of the toroidal swivel is configured to be connected to the first body;

a first fluid conduit configured to be in fluid communication with a fluid supply conduit disposed on the first body and the rotating part of the inline swivel, wherein the first fluid conduit comprises a first launch valve located between the fluid supply conduit and the rotating part of the inline swivel;

a second fluid conduit in fluid communication with the first fluid conduit and the rotating part of the toroidal swivel, wherein the second fluid conduit is in fluid communication with the first fluid conduit at a location located between the fluid supply conduit and the first launch valve, and wherein the second fluid conduit comprises a second launch valve located between the first fluid conduit and the rotating part of the toroidal swivel;

a third fluid conduit in fluid communication with the first fluid conduit and configured to be in fluid communication with a first fluid return conduit disposed on the first body, wherein the third fluid conduit is in fluid communication with the first fluid conduit at a location located between the first launch valve and the rotating part of the inline swivel, and wherein the third fluid conduit comprises a first return valve located between the first fluid conduit and the first fluid return conduit;

a fourth fluid conduit in fluid communication with the rotating part of the toroidal swivel and the third fluid conduit, wherein the fourth fluid conduit is in fluid communication with the third fluid conduit at a location located between the first fluid return conduit and the first return valve, and wherein the fourth fluid conduit comprises a second return valve located between the rotating part of the toroidal swivel and the first fluid return conduit;

a fifth fluid conduit in fluid communication with the fixed part of the inline swivel and configured to be in fluid communication with a fluid discharge conduit disposed on the second body, wherein the fifth fluid conduit comprises a third launch valve located between the fixed part of the inline swivel and the fluid discharge conduit;

a sixth fluid conduit in fluid communication with the fixed part of the toroidal swivel and the fifth fluid conduit, wherein the sixth fluid conduit is in fluid communication with the fifth fluid conduit at a location located between the fluid discharge conduit and the third launch valve, and wherein the sixth fluid conduit comprises a fourth launch valve located between the fixed part of the toroidal swivel and the fluid discharge conduit;

a seventh fluid conduit in fluid communication with the fifth fluid conduit and configured to be in fluid communication with a second fluid return conduit disposed on the second body, wherein the seventh fluid conduit is in fluid communication with the fifth fluid conduit at a location located between the third launch valve and the fixed part of the inline swivel, and wherein the seventh fluid conduit comprises a third return valve located between the fifth fluid conduit and the second fluid return conduit; and an eighth fluid conduit in fluid communication with the fixed part of the toroidal swivel and the seventh fluid conduit, wherein the eighth fluid conduit is in fluid communication with the seventh fluid conduit at a location located between the second fluid return conduit and the third return valve, and wherein the eighth fluid conduit comprises a fourth return valve located between the fixed part of the toroidal swivel and the second fluid return conduit.

2. The system of claim 1, wherein:
the fixed part of the inline swivel and the rotating part of the inline swivel are configured to maintain fluid communication between the first fluid conduit and the fifth fluid conduit as the first body rotates relative to the second body, and
the fixed part of the toroidal swivel and the rotating part of the toroidal swivel are configured to maintain fluid communication between the second fluid conduit, the fourth fluid conduit, the sixth fluid conduit and the eighth fluid conduit as the first body rotates relative to the second body.

3. The system of claim 2, wherein the rotating part of the inline swivel and the rotating part of the toroidal swivel are each configured to rotate about a longitudinal axis that is colinear with a longitudinal axis of the inline swivel, and a longitudinal axis of the toroidal swivel.

4. The system of claim 1, wherein the first body is a rotating part of a turret mooring system and the second body is a fixed part of the turret mooring system configured to be substantially rotationally fixed about a vertical axis relative to the earth.

5. The system of claim 1, wherein the first body is a vessel configured to float on a surface of a body of water and the second body is a fixed part of a turret mooring system configured to be substantially rotationally fixed about a vertical axis relative to the earth.

6. The system of claim 1, further comprising a control system, wherein the control system is configured to independently open and close the first launch valve, the second launch valve, the third launch valve, the fourth launch valve, the first return valve, the second return valve, the third return valve, and the fourth return valve.

7. The system of claim 1, further comprising a pig launcher configured to be disposed on the first body and configured to be in fluid communication with the first fluid conduit, and a pig receiver configured to be disposed on the first body and configured to be in fluid communication with the third fluid conduit.

8. The system of claim 1, wherein the third conduit is in fluid communication with the first conduit via a first piggable wye and the seventh fluid conduit is in fluid communication with the fifth fluid conduit via a second piggable wye.

9. The system of claim 8, wherein the first piggable wye and the second piggable wye each comprise a switch configured to direct a pig therethrough.

10. The system of claim 7, further comprising a pig detector disposed on the fluid supply conduit, the first fluid conduit, the fifth fluid conduit, or the fluid discharge conduit and a control system, wherein the control system is configured to independently open and close the first launch valve, the second launch valve, the third launch valve, the fourth launch valve, the first return valve, the second return valve, the third return valve, and the fourth return valve and to receive a signal from the pig detector indicating that a pig has passed the pig detector.

11. The system of claim 10, wherein the pig detector is disposed on the fifth fluid conduit or on the fluid discharge conduit.

12. The system of claim 11, wherein the control system is configured to place the system into a launch mode or into a receive mode.

13. The system of claim 12, wherein the control system is configured to switch the system from the launch mode to the receive mode after the pig detector has detected that a pig has passed the pig detector.

14. The system of claim 12, wherein:
the system is in the launch mode when the first launch valve is open, the second launch valve is closed, the third launch valve is open, the fourth launch valve is closed, the first return valve is closed, the second return valve is open, the third return valve is closed and the fourth return valve is open, and the system is in the receive mode when the first launch valve is closed, the second launch valve is open, the third launch valve is closed, the fourth launch valve is open, the first return valve is open, the second return valve is closed, the third return valve is open, and the fourth return valve is closed, or the system is in the launch mode when the first launch valve is open, the second launch valve is closed, the third launch valve is closed, the fourth launch valve is open, the first return valve is closed, the second return valve is open, the third return valve is open and the fourth return valve is closed, and the system is in the receive mode when the first launch valve is closed, the second launch valve is open, the third launch valve is open, the fourth launch valve is closed, the first return valve is open, the second return valve is closed, the third return valve is closed, and the fourth return valve is open.

15. The system of claim 1, wherein the first launch valve, the third launch valve, the first return valve, and the third return valve are each independently a through conduit ball valve or a through conduit gate valve.

16. The system of claim 1, further comprising a structure disposed within at least one of the second fluid conduit, the fourth fluid conduit, the sixth fluid conduit, and the eighth fluid conduit, wherein the structure is configured to prevent a pig from entering the second fluid conduit, the fourth fluid conduit, the sixth fluid conduit, and/or the eighth fluid conduit when the pig passes through the first fluid conduit, the third fluid conduit, the fifth fluid conduit, and/or the seventh fluid conduit, respectively.

17. A process for pigging between a first body rotatively coupled to a second body of a system, comprising:
inserting a pig into a first fluid conduit, wherein the system comprises:
an inline swivel comprising a fixed part and a rotating part, wherein the fixed part of the inline swivel is configured to be connected to the second body and the rotating part of the inline swivel is configured to be connected to the first body;
a toroidal swivel comprising a fixed part and a rotating part, wherein the fixed part of the toroidal swivel is configured to be connected to the second body and the rotating part of the toroidal swivel is configured to be connected to the first body;
a first fluid conduit configured to be in fluid communication with a fluid supply conduit disposed on the first body and the rotating part of the inline swivel, wherein the first fluid conduit comprises a first launch valve located between the fluid supply conduit and the rotating part of the inline swivel;
a second fluid conduit in fluid communication with the first fluid conduit and the rotating part of the toroidal swivel, wherein the second fluid conduit is in fluid communication with the first fluid conduit at a location located between the fluid supply conduit and the first launch valve, and wherein the second fluid conduit comprises a second launch valve located between the first fluid conduit and the rotating part of the toroidal swivel;
a third fluid conduit in fluid communication with the first fluid conduit and configured to be in fluid communication with a first fluid return conduit disposed on the first body, wherein the third fluid conduit is in fluid communication with the first fluid conduit at a location located between the first launch valve and the rotating part of the inline swivel, and wherein the third fluid conduit comprises a first return valve located between the first fluid conduit and the first fluid return conduit;
a fourth fluid conduit in fluid communication with the rotating part of the toroidal swivel and the third fluid conduit, wherein the fourth fluid conduit is in fluid communication with the third fluid conduit at a location located between the first fluid return conduit and the first return valve, and wherein the fourth fluid conduit comprises a second return valve located between the rotating part of the toroidal swivel and the first fluid return conduit;
a fifth fluid conduit in fluid communication with the fixed part of the inline swivel and configured to be in fluid communication with a fluid discharge conduit disposed on the second body, wherein the fifth fluid conduit comprises a third launch valve located between the fixed part of the inline swivel and the fluid discharge conduit;
a sixth fluid conduit in fluid communication with the fixed part of the toroidal swivel and the fifth fluid conduit, wherein the sixth fluid conduit is in fluid communication with the fifth fluid conduit at a location located between the fluid discharge conduit and the third launch valve, and wherein the sixth fluid conduit comprises a fourth launch valve located between the fixed part of the toroidal swivel and the fluid discharge conduit;
a seventh fluid conduit in fluid communication with the fifth fluid conduit and configured to be in fluid communication with a second fluid return conduit disposed on the second body, wherein the seventh fluid conduit is in fluid communication with the fifth fluid conduit at a location located between the third launch valve and the fixed part of the inline swivel, and wherein the seventh fluid conduit comprises a third return valve located between the fifth fluid conduit and the second fluid return conduit; and
an eighth fluid conduit in fluid communication with the fixed part of the toroidal swivel and the seventh fluid conduit, wherein the eighth fluid conduit is in fluid communication with the seventh fluid conduit at a location located between the second fluid return conduit and the third return valve, and wherein the eighth fluid conduit comprises a fourth return valve located between the fixed part of the toroidal swivel and the second fluid return conduit;
placing the system into a launch mode;
flowing a fluid from the fluid supply line to displace the pig from the first fluid conduit toward the inline swivel;
flowing the fluid until the pig has passed the third launch valve;
placing the system into a receive mode; and
flowing the fluid until the pig has entered the third fluid conduit.

18. The process of claim 17, wherein:
placing the system into the launch mode comprises configuring the system such that the first launch valve is open, the second launch valve is closed, the third launch valve is open, the fourth launch valve is closed, the first return valve is closed, the second return valve is open, the third return valve is closed and the fourth return valve is open, and wherein placing the system into the receive mode comprises configuring the system such that the first launch valve is closed, the second launch valve is open, the third launch valve is closed, the fourth launch valve is open, the first return valve is open, the second return valve is closed, the third return valve is open, and the fourth return valve is closed, or placing the system into the launch mode comprises configuring the system such that the first launch valve is open, the second launch valve is closed, the third launch valve is closed, the fourth launch valve is open, the first return valve is closed, the second return valve is open, the third return valve is open and the fourth return valve is closed, and wherein placing the system into the receive mode comprises configuring the system such that the first launch valve is closed, the second launch valve is open, the third launch valve is open, the fourth launch valve is closed, the first return valve is open, the second return valve is closed, the third return valve is closed, and the fourth return valve is open.

19. The process of claim 17, wherein the system further comprises at least one of:
a pig launcher in fluid communication with the fluid supply conduit, wherein inserting the pig into the first fluid conduit comprises loading the pig into the pig launcher, and
a pig receiver in fluid communication with the third fluid conduit, the process further comprising receiving the pig with the pig receiver.

20. The process of claim 17, wherein the system further comprises a pig detector and a control system, wherein the pig detector is disposed on the fifth fluid conduit or the fluid discharge conduit, and wherein placing the system in the receive mode is performed by the control system after the pig detector detects the pig has passed the pig detector.

* * * * *